US007222682B2

(12) United States Patent
Doering et al.

(10) Patent No.: US 7,222,682 B2
(45) Date of Patent: *May 29, 2007

(54) CHAIN DRIVE SYSTEM

(75) Inventors: Falk W. Doering, Houston, TX (US); Wade D. DuPree, Richmond, TX (US)

(73) Assignee: Schlumberger Technology Corp., Suger Land, TX (US)

( * ) Notice: Subject to any disclaimer, the term of this patent is extended or adjusted under 35 U.S.C. 154(b) by 248 days.

This patent is subject to a terminal disclaimer.

(21) Appl. No.: 10/857,395

(22) Filed: May 28, 2004

(65) Prior Publication Data

US 2005/0263325 A1     Dec. 1, 2005

(51) Int. Cl.
*E21B 4/00* (2006.01)

(52) U.S. Cl. .................. 175/106; 175/104; 175/107; 74/424.93

(58) Field of Classification Search ............... 175/104, 175/106, 107; 74/424.91, 424.92, 424.93
See application file for complete search history.

(56) References Cited

U.S. PATENT DOCUMENTS

| 418,328 | A | 12/1889 | Willett |
| 595,508 | A | 12/1897 | Wolander |
| 642,430 | A | 1/1900 | Corcoran |
| 1,416,163 | A | 5/1922 | Brock |
| 3,402,618 | A | 9/1968 | Roantree |
| 4,172,391 | A | 10/1979 | Dressel |
| 2005/0034874 | A1* | 2/2005 | Guerrero et al. ............ 166/380 |

FOREIGN PATENT DOCUMENTS

| DE | 2406360 A * | 8/1975 |
| DE | 3305551 A1 * | 2/1984 |
| DE | 3603122 A1 * | 8/1987 |
| JP | 57-67498 | 4/1982 |
| JP | 05116654 | 5/1993 |
| JP | 2000097293 | 4/2000 |

* cited by examiner

*Primary Examiner*—Jennifer H. Gay
*Assistant Examiner*—Robert Fuller
(74) *Attorney, Agent, or Firm*—Rodney Warfford; David Cate; Jaime Castano

(57) ABSTRACT

A downhole tractor is provided that includes a motor, at least one rotatable screw powered by the motor, and a chain engageable with the at least one rotatable screw, whereby rotation of the at least one rotatable screw moves the chain.

46 Claims, 8 Drawing Sheets

CHAIN DRIVE SYSTEM

BACKGROUND OF THE INVENTION

1. Field of the Invention

The present invention generally pertains to power transmissions systems, and more particularly to a system in which power is transferred from a power source via a rotatable screw member to a chain or other flexible drive member, such as a continuous drive belt.

2. Description of the Related Art

It is known within a variety of fields to use a drive sprocket to transfer rotational power from a power source, such as a motor, to a chain or other belt-type drive component. One example of this type of system is the drive system on a military tank in which power is transferred through a gear box to a drive sprocket which in turns drives the tracks of the tank. A similar example, but on a much more miniaturized scale, can be found in the oil and gas industry, in which downhole tractors include tracks that are driven by a drive sprocket. An example of a downhole tractor is shown in U.S. Pat. No. 4,670,862. Downhole tractors of this type are typically used to convey logging devices and other devices in horizontal and highly-deviated wells. As will become apparent from the following description and discussion, however, the present invention, which is also directed to systems for transferring rotary motion to an endless flexible device, overcomes the deficiencies of the previous devices and constitutes an improved and more efficient drive system.

SUMMARY OF THE INVENTION

In a broad aspect, the present invention is directed to systems in which rotary motion is used to drive a chain or other endless flexible device through the interaction of a rotatable screw with the chain or flexible device, as opposed to transferring power through a drive sprocket to the chain. In another aspect, the present invention may be a chain drive assembly comprising: a rotatable screw and a chain, the screw being engageable with the chain such that rotation of the screw causes linear movement of the chain. Another feature of this aspect of the invention may be that the assembly of claim 1, wherein the screw is a power screw, and further including a plurality of threaded components connected to the chain and threadably engageable with the power screw. Another feature of this aspect of the invention may be that the threaded components are split nuts. Another feature of this aspect of the invention may be that the threaded components are quarter nuts. Another feature of this aspect of the invention may be that the screw is a lead screw and the chain includes a plurality of rollers adapted for interacting engagement with the lead screw.

In another aspect, the present invention may be a chain drive assembly comprising a first rotatable screw, a second rotatable screw, and a chain, the first and second rotatable screws positioned in generally parallel relationship on opposite sides of the chain and engageable with the chain such that rotation of the first and second screws in opposite directions causes linear movement of the chain. Another feature of this aspect of the invention may be that each of the first and second screws is a power screw, and may further include a plurality of threaded components connected to first and second edges of the chain, the plurality of threaded components on the first edge of the chain being threadably engageable with the first power screw, and the plurality of threaded components on the second edge of the chain being threadably engageable with the second power screw. Another feature of this aspect of the invention may be that the threaded components are split nuts. Another feature of this aspect of the invention may be that the threaded components are quarter nuts. Another feature of this aspect of the invention may be that each of the first and second screws is a lead screw and the chain includes a plurality of rollers rotatably mounted along first and second edges of the chain, the plurality of rollers along the first edge of the chain being engageable with the first lead screw, and the plurality of rollers along the second edge of the chain being engageable with the second lead screw. Another feature of this aspect of the invention may be that the rollers are mounted to link pins that form part of the chain. Another feature of this aspect of the invention may be that the rollers are mounted to axles that are generally perpendicular to an upper surface of the chain. Another feature of this aspect of the invention may be that the rollers are adapted for rolling engagement with thread flanges on the screws.

In yet another aspect, the present invention may be a chain drive assembly comprising: a first and a second chain, and a first, a second, a third and a fourth rotatable screw, the first and second rotatable screws positioned in generally parallel relationship on opposite sides of the first chain and engageable with the first chain such that rotation of the first and second screws in opposite directions causes linear movement of the first chain, and the third and fourth rotatable screws positioned in generally parallel relationship on opposite sides of the second chain and engageable with the second chain such that rotation of the third and fourth screws in opposite directions causes linear movement of the second chain.

In still another aspect, the present invention may be a vehicle comprising: a motor; a rotatable screw powered by the motor; a flexible track engaged with the screw, whereby rotation of the screw causes movement of the track. Another feature of this aspect of the invention may be that the flexible track is a chain. Another feature of this aspect of the invention may be that the screw is a power screw and the chain further includes a plurality of threaded members that are engageable with the screw. Another feature of this aspect of the invention may be that the threaded members are portions of threaded nuts. Another feature of this aspect of the invention may be that the threaded members are split nuts. Another feature of this aspect of the invention may be that the threaded members are quarter nuts. Another feature of this aspect of the invention may be that the screw is a lead screw and the chain further includes a plurality of rollers that are adapted for rolling engagement with a thread flange of the lead screw. Another feature of this aspect of the invention may be that the vehicle is a downhole tractor.

This section to be supplemented upon completion of new claims.

In another aspect, the present invention may be a method of converting rotary motion into linear motion comprising: providing a rotatable screw, providing a flexible track, engaging the screw with the flexible track, and rotating the screw so as to move the flexible track.

Other features, aspects and advantages of the present invention will become apparent from the following discussion

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Figure 1:
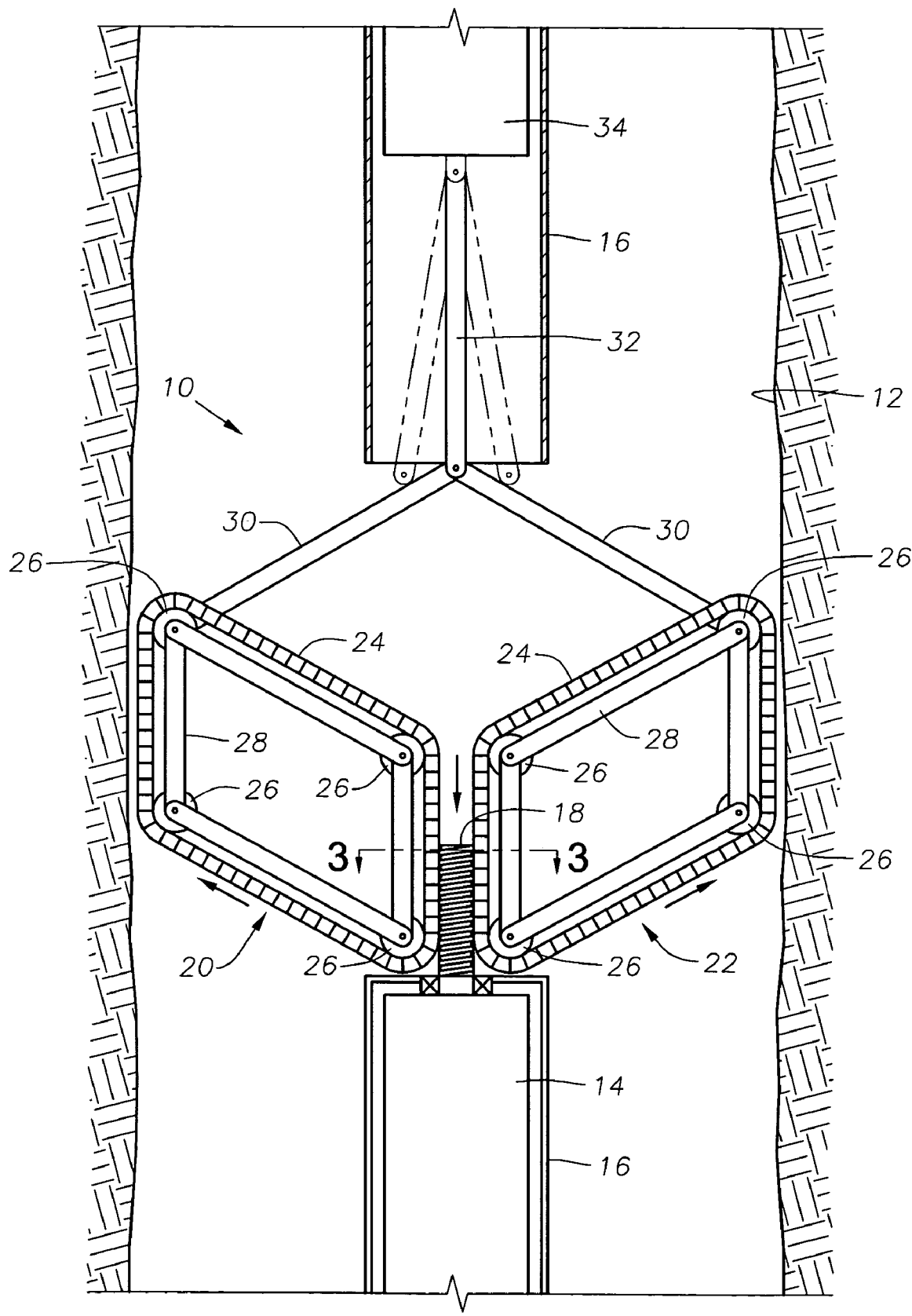
FIG. 1 is a side view of a specific embodiment of a downhole tractor that includes a specific embodiment of a chain drive system in accordance with the present invention, and shown in a deployed position.

Referring to the drawings in detail, wherein like numerals denote identical elements throughout the several views, there is shown in FIG. 1 a specific embodiment of a downhole tractor 10 that includes a specific embodiment of a chain drive system constructed in accordance with the present invention, as will be more fully explained below. In FIG. 1, the tractor 10 is shown in a deployed position and engaged with an open, or non-cased, well bore 12. The tractor 10 may include a main motor 14 disposed within a housing 16. The main motor 14 is adapted to rotate a screw 18, such as a power screw or a lead screw, for example. The screw 18 includes a central longitudinal axis that may be generally co-axial with a central longitudinal axis of a tool string (not shown) to which the tractor 10 is connected. The screw 18 may be directly or indirectly mounted or coupled to the motor shaft. The tractor 10 also includes, in this embodiment, a first and a second track assembly 20 and 22, each of which includes a flexible track 24 or endless belt rotatably disposed about four wheels 26 (e.g., idler sprockets) mounted to a collapsible parallelogram frame 28. In a specific embodiment, the flexible track 24 may be a chain, as further discussed below. Each frame 28 may be connected by a link 30 to a telescoping arm 32 that is connected to and powered by an auxiliary motor 34 disposed within the housing 16. The arm 32 is shown in a fully-extended position in FIG. 1, which position coincides with each track 24 being engaged with the open well bore 12. When the arm 32 is retracted, each track assembly 20/22 is pulled into a retracted position (not shown). The links 30 are shown in dashed lines in their retracted positions, which correspond to the retracted position of the track assemblies 20/22.

Figure 2:
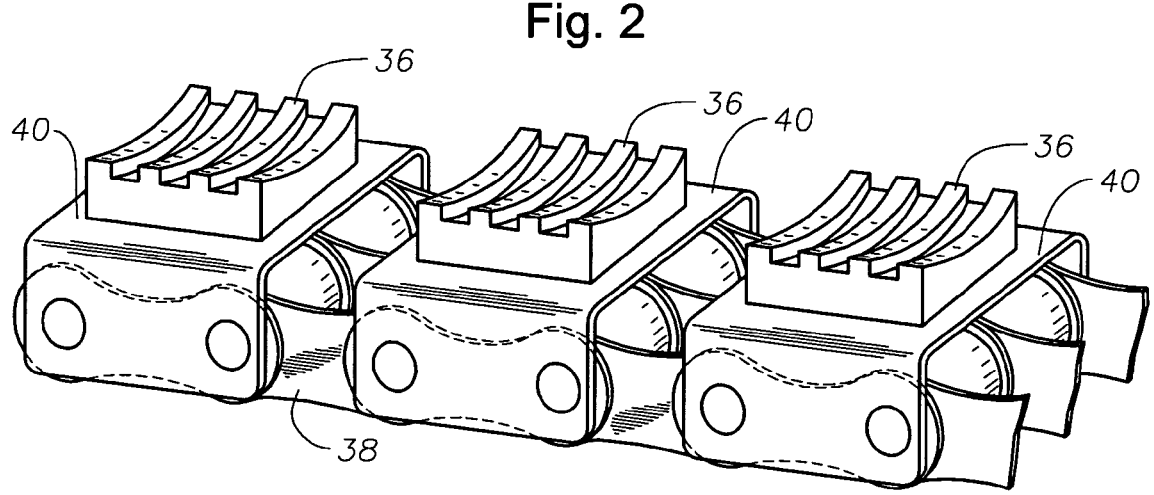
FIG. 2 is a perspective view of a section of chain that may be used in the system shown in FIG. 1, and illustrates the attachment of a plurality of split nuts to the chain.

The manner in which the screw 18 causes the tracks 24 to move will now be explained. In a specific embodiment, in which each flexible track 24 is a chain, as shown in FIG. 2, a series of split nuts 36 may be secured to a chain 38, such as by mounting to link plates 40 on top of the chain 38. The split nuts 36 are preferably of appropriate size and thread dimensions so as to be engageable with threads on the screw 18, which in this embodiment is a power screw. With reference to FIG. 1, the tracks 24 are mounted in relation to the screw 18 such that the split nuts 36 will engage the screw 18. As such, when the screw 18 is rotated, the splits nuts 36, by virtue of being threadably engaged with the screw 18, will travel downwardly along the screw 18. This will result in movement of the chain 38 in a direction generally along the central axis of the screw 18, and will thus also result in rotation of the tracks 24/chain 38 in a first direction as indicated by the arrows in FIG. 1. This will cause the tractor 10 to move downwardly within the well bore 12. The direction of rotation of the tracks 24/chain 38 may be reversed by reversing the rotation of the screw 18, which will cause the tractor 10 to reverse its direction of movement and move upwardly within the well bore 12. A gearbox (not shown) may also be provided between the motor 14 and the screw 18, depending on the lead of the screw 18 and design specifications.

Figure 3:
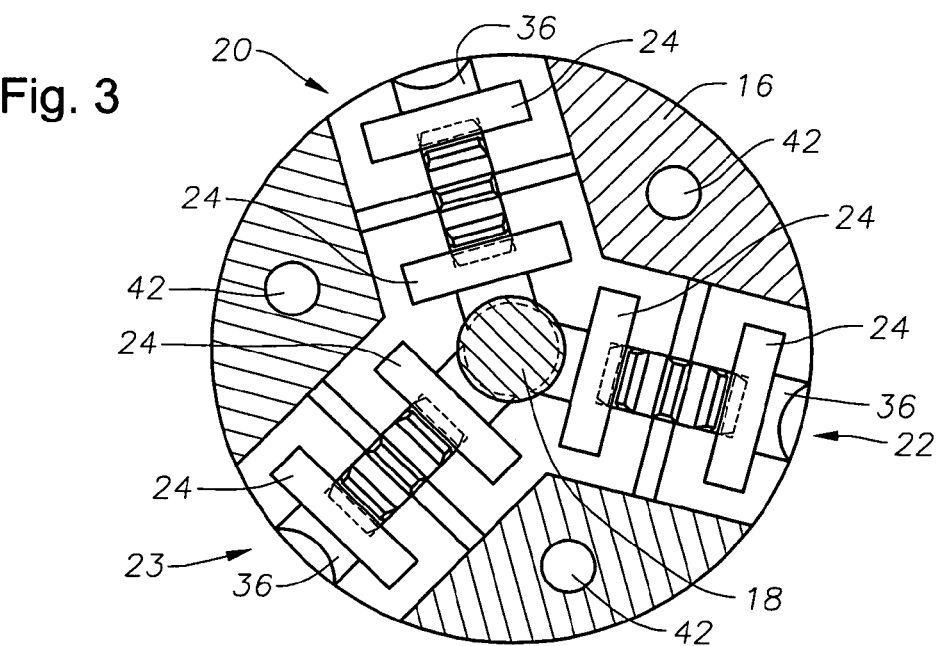
FIG. 3 is a cross-sectional view taken along line 3—3 of FIG. 1.

Referring to FIG. 3, which is a cross-sectional view taken along line 3—3 of FIG. 1, it can be seen that, in another specific embodiment, the tractor 10 may be provided with three track assemblies 20, 22, and 23, all driven by the single screw 18. Alternatively, the tractor 10 may be provided with a single track assembly. While the chain path shown in FIG. 1 is in the shape of a parallelogram, it may also be in other shapes, such as a triangle or trapezoid. The thread length of the screw 18 may be equal to the length of a chain link, or equal to the length of the interacting chain, or longer if desired. In a specific embodiment, the thread of the screw 18 may be trapezoidal, square, triangular, round or rectangular. The screw 18 may also be provided with multiple thread starts. FIG. 3 also illustrates that the housing 16 may be provided with one or more channels 42 for passage of any variety of signals, such as through electric or fiber optic cables, and/or hydraulic fluid.

Figure 4:
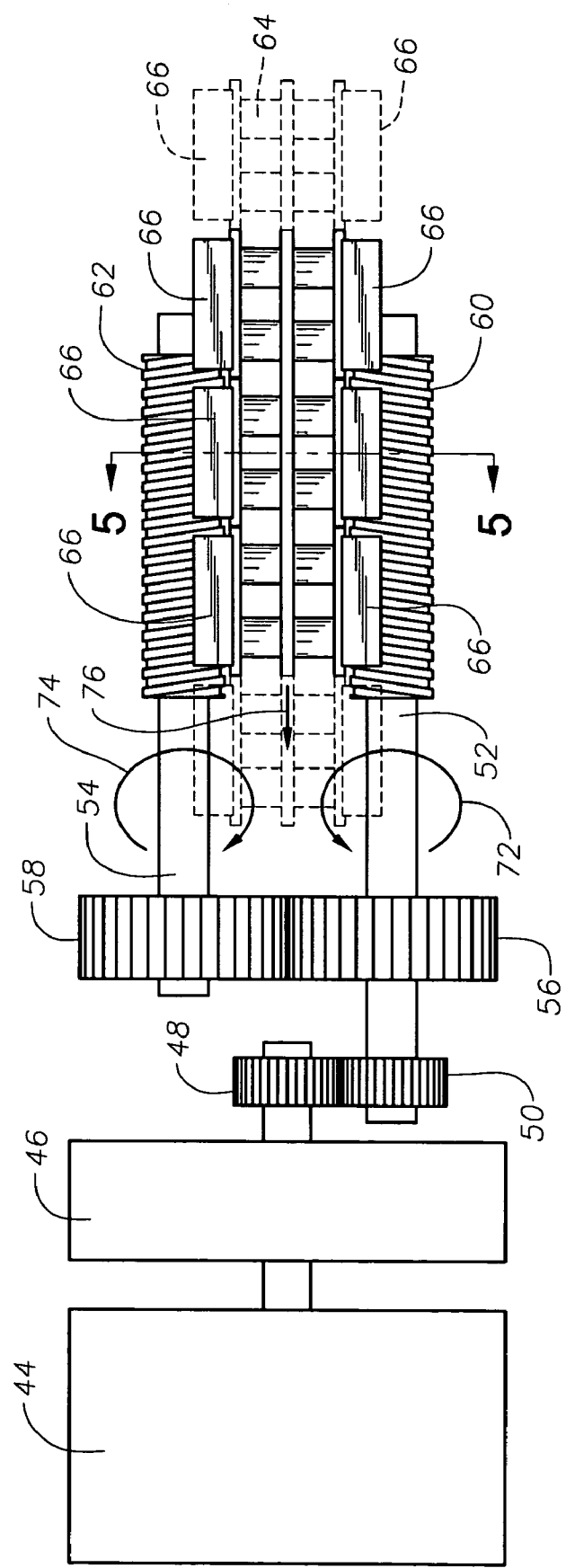
FIG. 4 is a side view, partially in cross-section, of another specific embodiment of a chain drive system in accordance with the present invention, which includes quarter nuts attached to opposite sides of a chain, which nuts engage threads of generally parallel power screws that are disposed on opposite sides of the chain.
Figure 5:
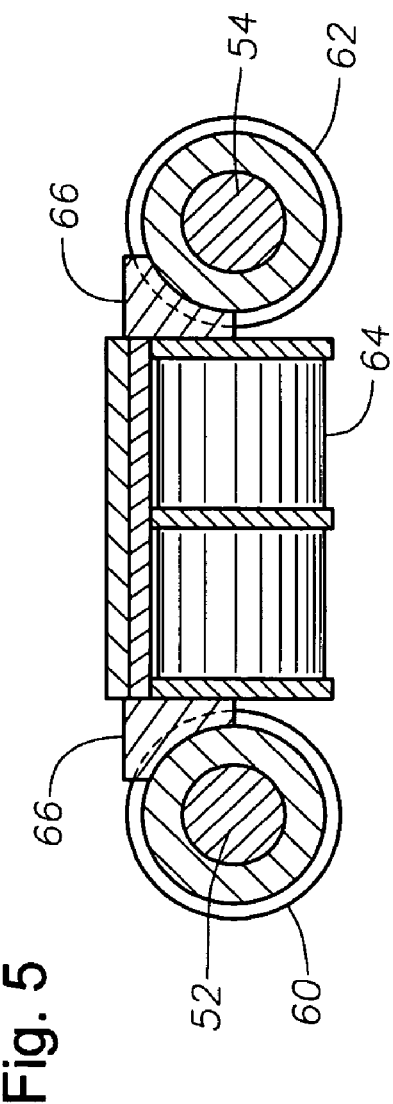
FIG. 5 is a cross-sectional view taken along line 5—5 of FIG. 4.
Figure 6:
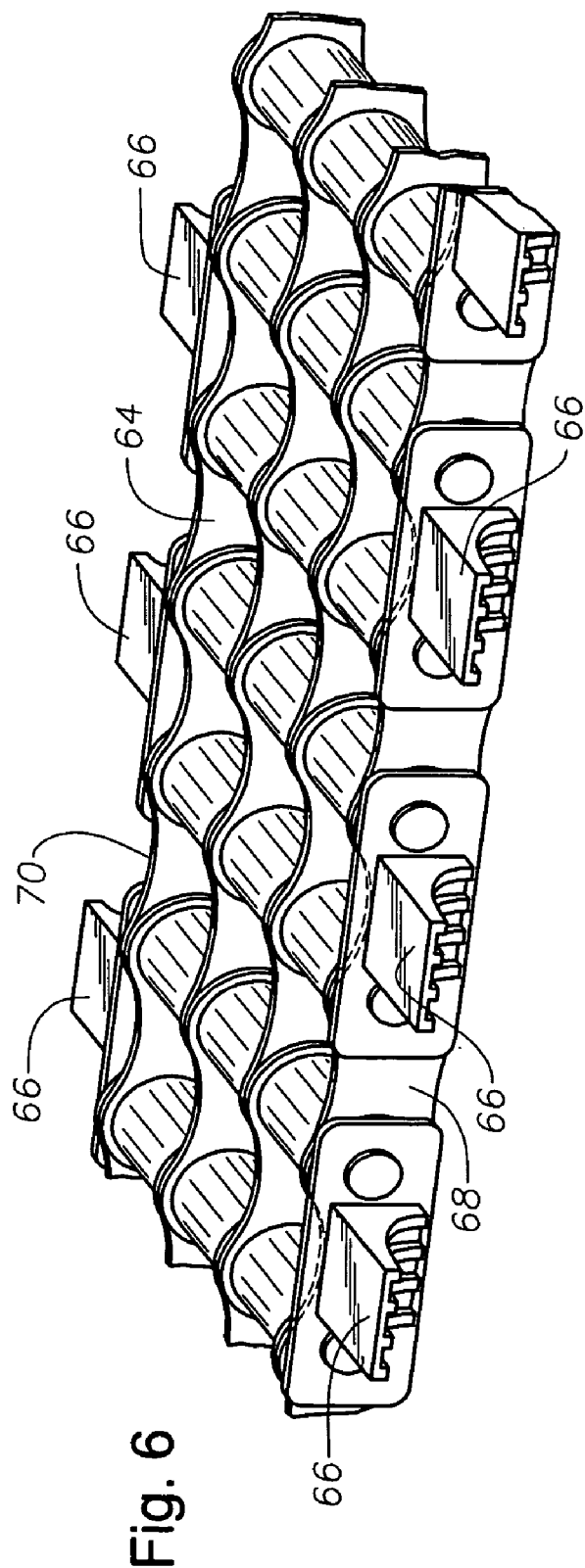
FIG. 6 is a perspective view of a section of the chain shown in FIG. 4, and illustrates the attachment of a plurality of quarter nuts to the chain.

Another specific embodiment of the present invention is shown in FIG. 4, wherein a motor 44 is adapted to transfer rotary power through a gear box 46 to a first gear 48 that is meshed with a second gear 50. The second gear 50 is mounted to a first shaft 52. A third gear 56 and a first screw 60 are also mounted to the first shaft 52. The third gear 56 is meshed with a fourth gear 58 that is mounted to a second shaft 54. A second screw 62 is also mounted to the second shaft 54. The first and second shafts 52 and 54, and the first and second screws 60 and 62, are disposed in generally parallel relationship. A flexible track, such as a chain 64, is disposed between the first and second shafts 52 and 54, and engaged with the first and second screws 60 and 62. More specifically, as best shown in FIGS. 5 and 6, a plurality of quarter nuts 66 are secured to opposed edges 68 and 70 of the chain 64. The chain 64 is disposed between the first and second screws 60 and 62 such that the quarter nuts 66 will engage threads on the corresponding screws 60 and 62. When the motor 44 is energized, rotary power will be transferred through the gear box 46 to rotate the first gear 48, which will rotate the second gear 50, which will rotate the third gear 56 and the first screw 60 in a first direction, as indicated by arrow 72. Movement of the third gear 56 will simultaneously cause the fourth gear 58 and the second screw 62 to rotate in a second direction, as indicated by arrow 74, which is opposite of the direction in which first screw 60 rotates. As the screws 60 and 62 rotate in opposite directions, the quarter nuts 66 are threadably moved along the rotating screws 60 and 62, thereby resulting in movement of the chain 64 in the direction of arrow 76, and generally along central axes of the screws 60 and 62.

Figure 7:
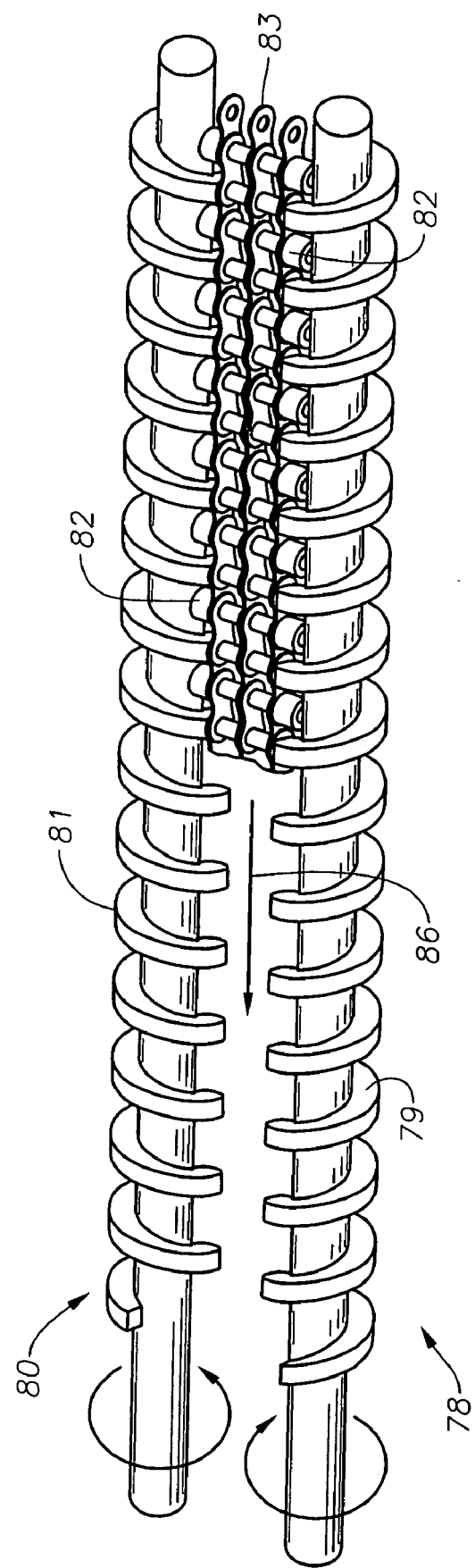
FIG. 7 is a perspective view of another specific embodiment of a chain drive system in accordance with the present invention, which includes rollers mounted to the chain pins, which rollers engage helices of generally parallel lead screws that are disposed on opposite sides of the chain.

Another specific embodiment of the present invention is shown in FIG. 7. The embodiment in FIG. 7 is similar to the embodiment shown in FIG. 4 insofar as both embodiments include generally parallel screws that rotate in opposite directions and engage a chain that is disposed between the screws. But the embodiment in FIG. 7 employs first and second lead screws 78 and 80, whereas the screws 60 and 62 disclosed in FIG. 4 are power screws. Each lead screw 78 and 80 includes a corresponding helix, or thread flange, 79 and 81. Another difference between the embodiments in FIGS. 4 and 7 pertains to the manner in which the screws 78 and 80 engage with the chain 83. In FIG. 7, the power screws 78 and 80 engage rollers 82 that are rotatably mounted to pins 84 that hold links of the chain 83 together, which pins 84 may be extended from their normal lengths to accommodate the rollers 82. The rollers 82 and pins 84 are more easily seen in FIG. 8. As shown in FIG. 7, in a specific embodiment, the chain 83 is positioned in relation to the first and second lead screws 78 and 80 such that a roller 82 is positioned between consecutive turns of each thread flange 79 and 80. In operation, when the lead screws 78 and 80 are simultaneously rotated in opposite directions, the rollers 82 will roll along the corresponding thread flange 79/81 in the direction of arrow 86, which will result in movement of the chain 83 in the direction of arrow 86, in a general direction along the central longitudinal axes of the screws 78 and 80. Although not shown in FIG. 7, rotary movement may be imparted to the screws 78 and 80 in any known manner, including, for example, by use of the motor 44 and gearbox 46 configuration shown in FIG. 4.

Figure 8:
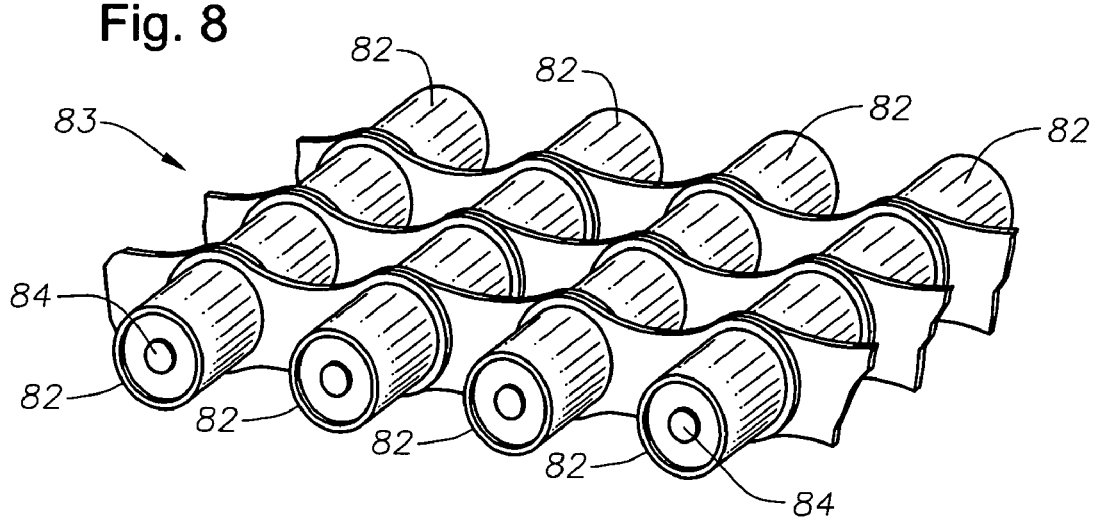
FIG. 8 is a perspective view showing a portion of the chain shown in FIG. 7, from which the rollers are more easily seen.
Figure 9:
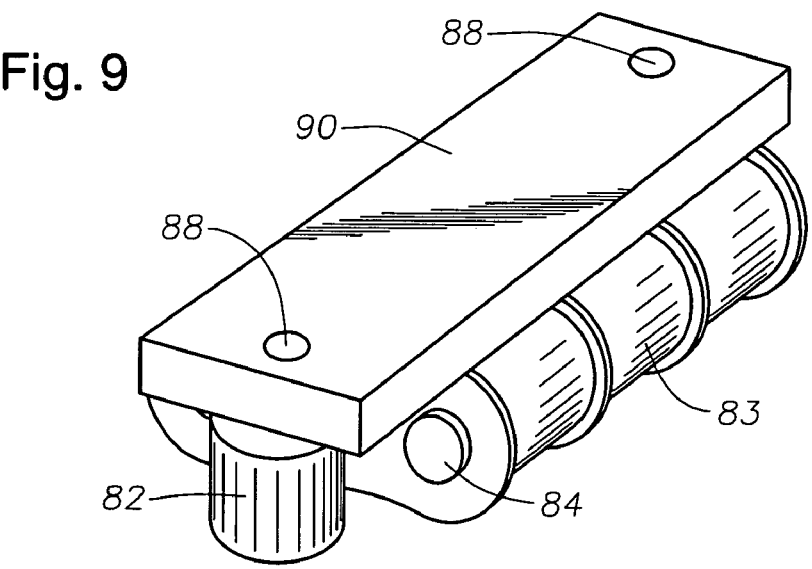
FIG. 9 is a perspective view showing an alternative design for connecting rollers to a chain.
Figure 10:
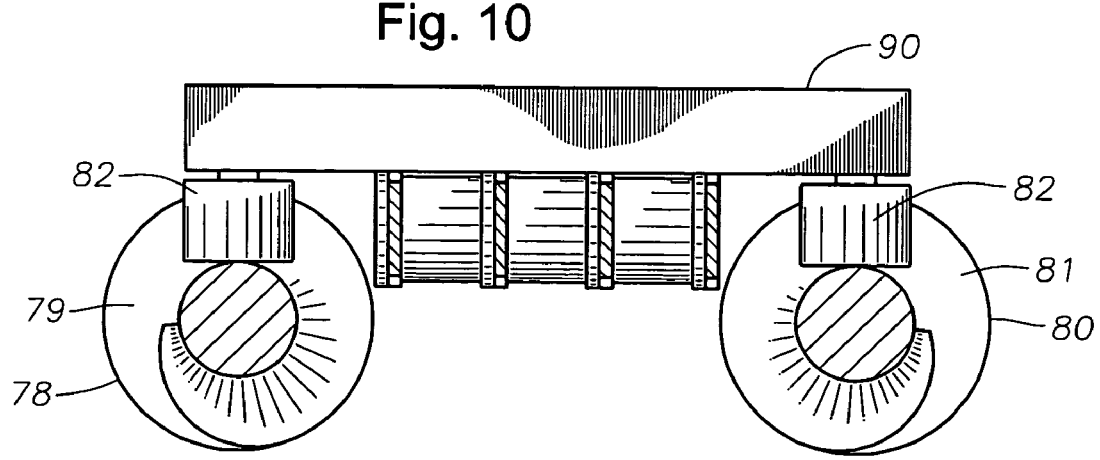
FIG. 10 is an end view of the design shown in FIG. 9, and further illustrating the rollers engaged with two lead screws that are disposed in generally parallel relationship on opposite side of the chain to which the rollers are secured.

An alternative design for mounting the rollers 82 to the chain 83 is shown in FIGS. 9 and 10. Instead of mounting the rollers 82 to the pins 84 that form part of the chain 83, as shown in FIG. 8, in the embodiment shown in FIGS. 9 and 10 the rollers 82 are mounted to axles 88 that are mounted to a link plate 90. In a specific embodiment, the axles 88 may be mounted such that they are generally perpendicular to an upper surface of the chain 83. The link plate 90 is secured to the chain 83 in any known manner. As best shown in FIG. 10, the rollers 82 are mounted so as to engage and roll along the thread flanges 79/81 of the screws 78/80, thereby resulting in movement of the chain 83 in the same manner as discussed above in connection with FIG. 7.

Figure 11:
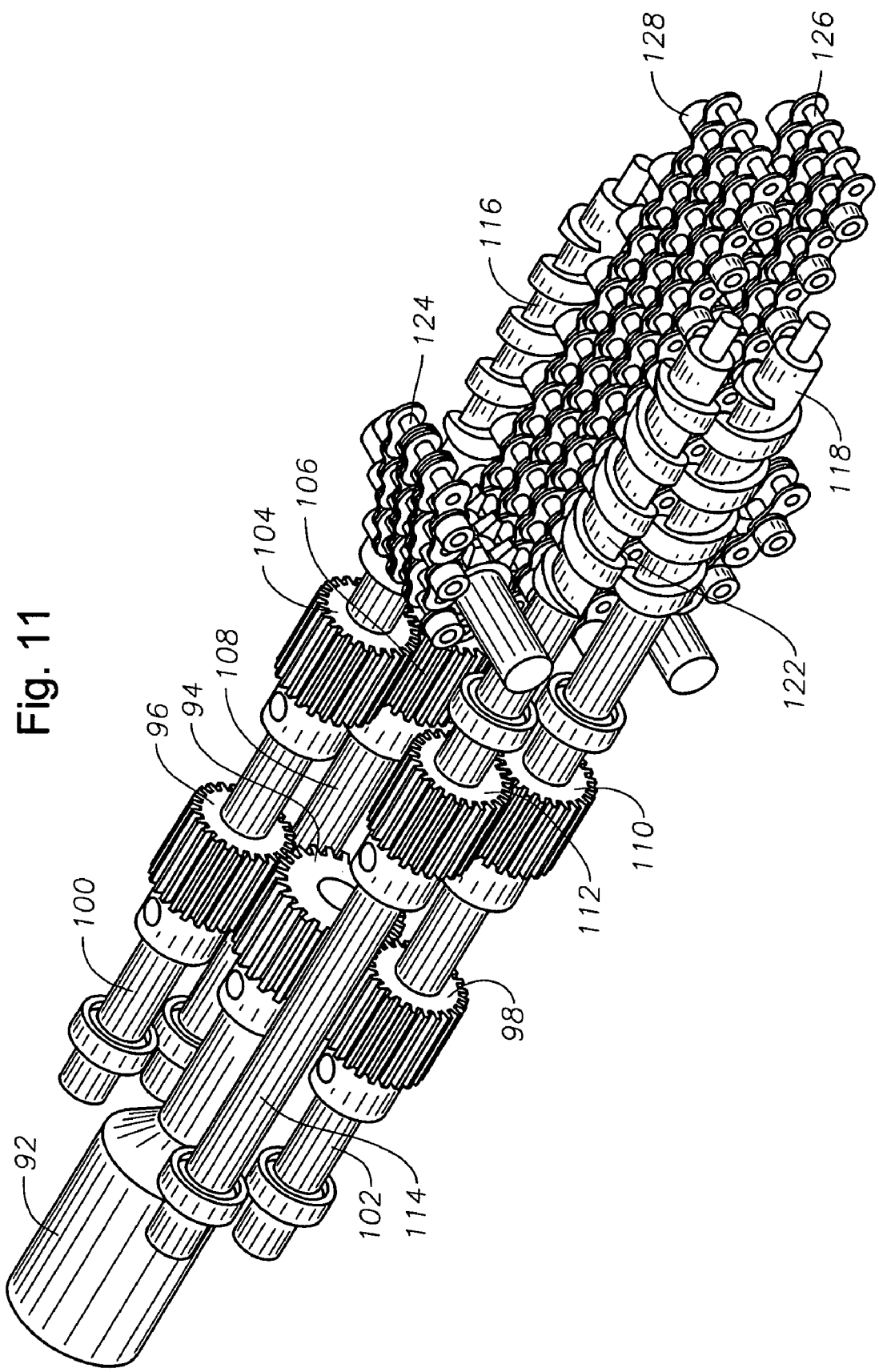
FIG. 11 is a perspective view showing an alternative embodiment of a chain drive system constructed in accordance with the present invention.
Figure 12:
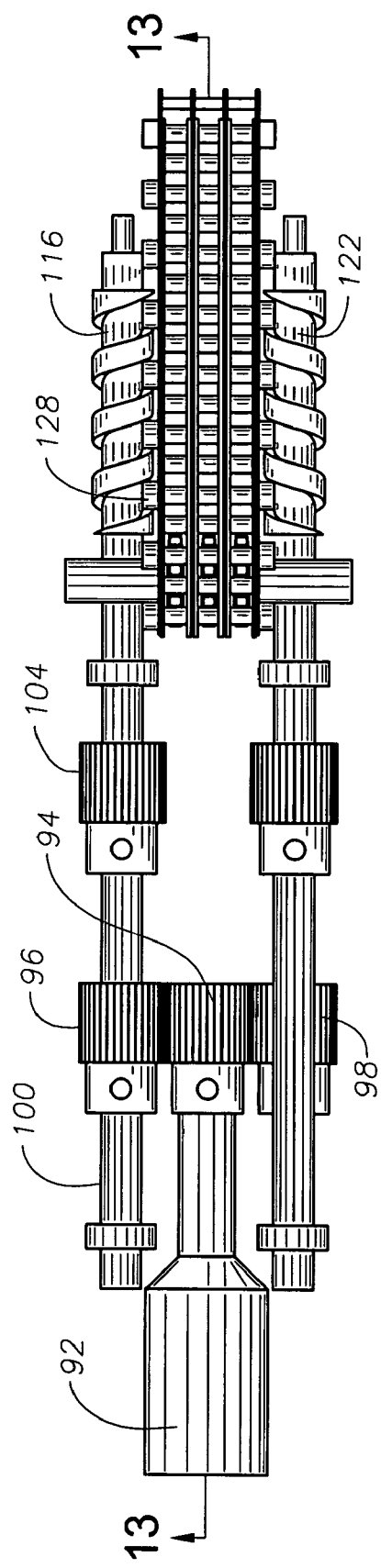
FIG. 12 is a top view of the system shown in FIG. 11.
Figure 13:
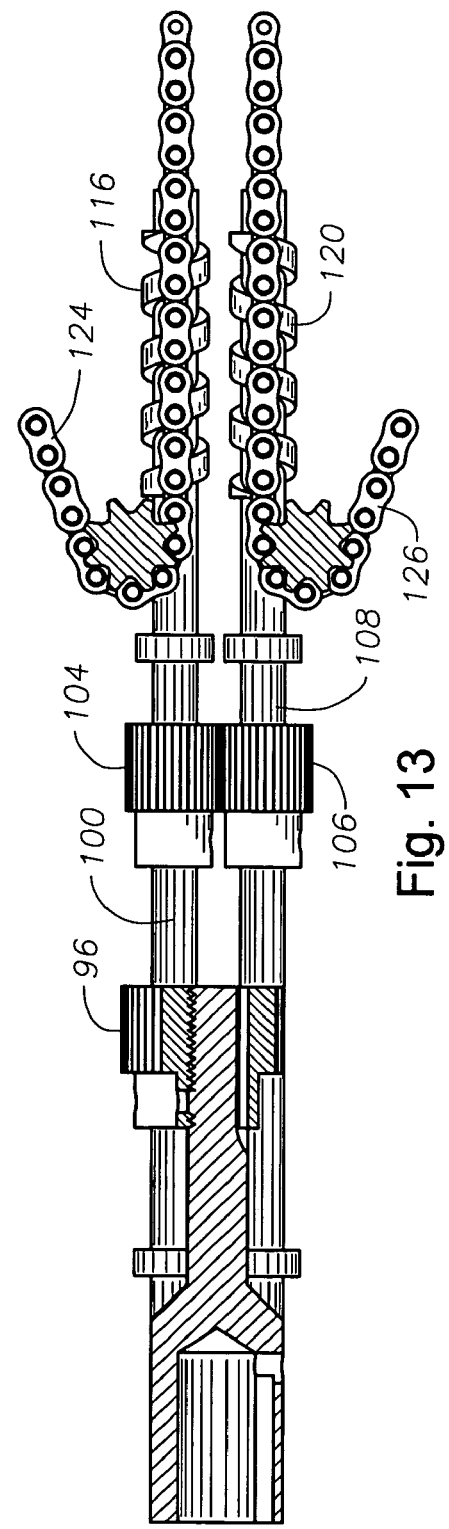
FIG. 13 is a cross-sectional view taken along line 13—13 of FIG. 12.

Another specific embodiment of the present invention in which rollers and lead screws are used is illustrated in FIGS. 11-13. As best shown in FIG. 11, in this embodiment, a motor 92 powers a central drive gear 94 which is meshed with a first gear 96 and a second gear 98. The first gear 96 is mounted to a first shaft 100 on one side of the motor 92, and the second gear 98 is mounted to a second shaft 102 on an opposite side of the motor 92. A third gear 104 is also mounted to the first shaft 100, and is meshed with a fourth gear 106, which is mounted on a third shaft 108. The third shaft 108 is disposed below and generally parallel to the first shaft 100. A fifth gear 110 is mounted to the second shaft 102, and is meshed with a sixth gear 112, which is mounted on a fourth shaft 114. The fourth shaft 114 is disposed above and generally parallel to the second shaft 102. All of the shafts are preferably rotatably mounted within bearings in a manner known in the art. It can be seen that rotation of the central drive gear 94 will result in rotation of each of the shafts 100, 102, 108 and 114 in various directions of rotation, as will be better understood from the further description below. A lead screw is directly or indirectly coupled to each shaft, to include the screw and corresponding shaft being formed as a single unitary structure. More specifically, a first lead screw 116 is coupled to the first shaft 100; a second lead screw 118 is coupled to the second shaft 102; a third lead screw 120 is coupled to the third shaft 108; and a fourth lead screw 122 is coupled to the fourth shaft 114.

As best shown in FIG. 13, this specific embodiment of the present invention is designed to drive two flexible tracks, or chains, namely a first chain 124 and a second chain 126. While this embodiment is shown with two chains, that number should not be taken as a limitation, as this embodiment could easily be adapted for use with other numbers of chains. In this specific embodiment, as shown in FIGS. 11 and 12, the chains 124 and 126 are equipped with rollers 128 mounted in the same manner discussed above and depicted in FIG. 8. The rollers 128 are positioned relative to the lead screws 116, 118, 120 and 122 so as to move the chains 124 and 126 in the same manner as described above and shown in FIG. 7. In more particular, the first chain 124 is disposed between and powered by the first lead screw 116 and the fourth lead screw 122; and the second chain 126 is disposed between and powered by the second lead screw 118 and the third lead screw 120. It is further noted that the helices, or threaded flanges, on the respective lead screws 116, 118, 120 and 122 are appropriately disposed in counter- and/or like rotating directional relationships to one another so as to work in unison to move the respective rollers 128 and chains 124/126 in the desired direction, as will be readily understood by those of ordinary skill in the art. In a specific embodiment, the first and fourth screws 116 and 122 rotate in opposite directions, the second and third screws 118 and 120 rotate in opposite directions, the second and fourth screws 118 and 122 rotate in opposite directions, and the first and third screws 116 and 120 rotate in opposite directions.

One notable difference between the designs of FIGS. 7 and 11 versus the designs of FIGS. 1 and 4 relates to the relative mechanical efficiency of the designs. When the designs are compared in this light, it is noted that the "rolling friction" associated with the use of the rollers 82/128 to engage the lead screws in FIGS. 7 and 11 is less than the "sliding friction" associated with the use of the split and quarter nuts 36/66 to engage the power screws 18/60/62 in FIGS. 1 and 4. For that reason, the "rolling" design of the type shown in FIGS. 7 and 11 is preferred over the "sliding" designs of the type shown in FIGS. 1 and 4.

The drive systems of the present invention as described hereinabove may be employed in a wide variety of applications, including for example in downhole tractors for use in oil and gas exploration. As space and mechanical packaging area are at a premium when operating in a downhole well environment, the present invention is advantageous in comparison to previous downhole tractors. A conventional sprocket-drive system in this environment would be limited under abrasive downhole oil and gas conditions in efficiency, reliability and strength. Another advantage of the present invention is that turning rotary motion into linear motion in a plane perpendicular to the rotary motion is avoided. Such a constraint occurs due to the position of the gearbox and drive motor for downhole tractors, in which the gearbox and motor are co-axial with the tool string axis whereas the axis of the drive sprocket is perpendicular to the axis of rotary motion. But through use of the present invention, power is transferred to the chain through a screw, which is on axis with the tool string axis, resulting in linear movement of the chain, without converting rotary motion into an axis perpendicular to the tool string axis. This approach inherently lessens the gear reduction required from the motor to the screw since the screw pitch can be adjusted to change the final drive ratio of the chain, and, to the extent a gearbox is used or desired, will result in a more simplified and reliable gearbox.

The present invention may be equally applicable in other contexts. For example, a chain driven by a drive screw could replace the mechanism in a conventional chain-type garage door opening system or in a similar but more heavy-duty mechanical system where space is an issue or in which sprockets may not be used or where the forces applied to the chain links must be distributed differently to avoid sprocket failure. This invention may also have an application in any chain-drive system where limitations in space and power require the drive motor to be aligned in the axis of the chain direction and/or where a 90-degree change of torque direction with respect to the motor is not possible. By use of the present invention, the track element of a device such as a snowmobile, chain-type digging machine or conveying machine may be reduced in size by replacing a sprocket-drive system with a screw-driven chain system. A tractor-mounted trenching device is an example of a design where the torque supplied by the tractor's power take off is at a 90-degree angle in relation to the torque direction required by a sprocket-driven trenching chain. Use of the present invention in this situation would simplify the transmission of such a device, thereby making it more economical to manufacture.

Another advantage of the present invention over sprocket-driven tracks is that a constant speed of the track or chain is achieved with the present invention whereas the speed of a sprocket-driven track will oscillate or surge. As will be understood by those of skill in the art, sprockets include driving teeth with valleys or troughs between each tooth. The speed of the sprocket-driven chain will be at its maximum when the driven portion of the chain is in contact with the top of the teeth, and at its minimum when in contact with the valleys. With the present invention, however, since the screw thread or helix flange is in constant and continuous contact with the nuts or rollers, there is no oscillation or surging and thus the speed of the driven chain or track remains constant.

It is to be understood that the invention is not limited to the exact details of construction, operation, exact materials or embodiments shown and described, as obvious modifications and equivalents will be apparent to one skilled in the art. For example, while the invention has been described and illustrated through use of a multiplex roller chain, the invention is not so limited, but also encompasses other types of chains, such as simplex roller chains, silent chains, and track chains like on a military tank, and may further include other types of flexible devices, such as a belt or rope. As another example, while the embodiments of FIGS. 1 and 4 use split nuts 36 and quarter nuts 66, respectively, to engage a screw in a sliding friction type manner, other mechanical protrusions, such as monolithic rubbing blocks made of a low friction metal or plastic material, may be used to engage a screw. Accordingly, the invention is therefore to be limited only by the scope of the appended claims.

The invention claimed is:

1. A downhole tractor assembly comprising a chain drive, the chain drive comprising:
   at least one rotatable screw; and
   a chain, the at least one rotatable screw being engageable with the chain such that rotation of the at least one rotatable screw causes linear movement of the chain.

2. The assembly of claim 1, wherein the screw is a power screw, and further including a plurality of threaded components connected to the chain and threadably engageable with the power screw.

3. The assembly of claim 2, wherein the threaded components are split nuts.

4. The assembly of claim 2, wherein the threaded components are quarter nuts.

5. The assembly of claim 1, wherein the at least one rotatable screw is a lead screw and the chain includes a plurality of rollers adapted for interacting engagement with the lead screw.

6. The assembly of claim 1, wherein the at least one rotatable screw comprises first and second rotatable screws positioned in generally parallel relationship on opposite sides of the chain and engageable with the chain such that rotation of the first and second screws in opposite directions causes said linear movement of the chain.

7. The assembly of claim 6, wherein each of the first and second screws is a power screw, and further including a plurality of threaded components connected to first and second edges of the chain, the plurality of threaded components on the first edge of the chain being threadably engageable with the first power screw, and the plurality of threaded components on the second edge of the chain being threadably engageable with the second power screw.

8. The assembly of claim 7, wherein the threaded components are split nuts.

9. The assembly of claim 7, wherein the threaded components are quarter nuts.

10. The assembly of claim 6, wherein each of the first and second screws is a lead screw and the chain includes a plurality of rollers rotatably mounted along first and second edges of the chain, the plurality of rollers along the first edge of the chain being engageable with the first lead screw, and the plurality of rollers along the second edge of the chain being engageable with the second lead screw.

11. The assembly of claim 10, wherein the rollers are mounted to link pins that form part of the chain.

12. The assembly of claim 10, wherein the rollers are mounted to axles that are generally perpendicular to an upper surface of the chain.

13. The assembly of claim 10, wherein the rollers are adapted for rolling engagement with thread flanges on the screws.

14. The assembly of claim 1, wherein the chain comprises a first and a second chain, and wherein the at least one rotatable screw comprises a first, a second, a third and a fourth rotatable screw,
   the first and second rotatable screws positioned in generally parallel relationship on opposite sides of the first chain and engageable with the first chain such that rotation of the first and second screws in opposite directions causes linear movement of the first chain, and the third and fourth rotatable screws positioned in generally parallel relationship on opposite sides of the second chain and engageable with the second chain such that rotation of the third and fourth screws in opposite directions causes linear movement of the second chain.

15. A downhole tractor vehicle comprising:
a motor;
at least one rotatable screw powered by the motor;
a flexible track engaged with the at least one rotatable screw, whereby rotation of the at least one rotatable screw causes movement of the track.

16. The vehicle of claim 15, wherein the flexible track is a chain.

17. The vehicle of claim 16, wherein the screw is a power screw and the chain further includes a plurality of threaded members that are engageable with the screw.

18. The vehicle of claim 17, wherein the threaded members are portions of threaded nuts.

19. The vehicle of claim 17, wherein the threaded members are split nuts.

20. The vehicle of claim 17, wherein the threaded members are quarter nuts.

21. The vehicle of claim 15, wherein the at least one rotatable screw is a lead screw and the chain further includes a plurality of rollers that are adapted for rolling engagement with a thread flange of the lead screw.

22. A downhole tractor comprising:
a motor,
at least one rotatable screw powered by the motor, and
a chain engageable with the at least one rotatable screw, whereby rotation of the at least one rotatable screw moves the chain.

23. The downhole tractor of claim 22, wherein the at least one rotatable screw is a power screw, and further including a plurality of threaded components connected to the chain and threadably engageable with the power screw.

24. The downhole tractor of claim 23, wherein the threaded components are split nuts.

25. The downhole tractor of claim 23, wherein the threaded components are quarter nuts.

26. The downhole tractor of claim 22, wherein the at least one rotatable screw is a lead screw and the chain includes a plurality of rollers adapted for interacting engagement with the lead screw.

27. The downhole tractor of claim 22, wherein the at least one rotatable screw comprises:
first and second rotatable screws positioned in generally parallel relationship on opposite sides of the chain and engageable with the chain such that rotation of the first and second screws in opposite directions causes linear movement of the chain.

28. The downhole tractor of claim 27, wherein each of the first and second screws is a power screw, and further including a plurality of threaded components connected to first and second edges of the chain, the plurality of threaded components on the first edge of the chain being threadably engageable with the first power screw, and the plurality of threaded components on the second edge of the chain being threadably engageable with the second power screw.

29. The downhole tractor of claim 28, wherein the threaded components are split nuts.

30. The downhole tractor of claim 28, wherein the threaded components are quarter nuts.

31. The downhole tractor of claim 27, wherein each of the first and second screws is a lead screw and the chain includes a plurality of rollers rotatably mounted along first and second edges of the chain, the plurality of rollers along the first edge of the chain being engageable with the first lead screw, and the plurality of rollers along the second edge of the chain being engageable with the second lead screw.

32. The downhole tractor of claim 31, wherein the rollers are mounted to link pins that form part of the chain.

33. The dowuhole tractor of claim 31, wherein the rollers are mounted to axles that are generally perpendicular to an upper surface of the chain.

34. The downhole tractor of claim 31, wherein the rollers are adapted for rolling engagement with thread flanges on the screws.

35. The downhole tractor of claim 22, wherein the chain comprises a first and a second chain, and the at least one rotatable screw comprises a first, a second, a third and a forth rotatable screw, each screw being powered by the motor,
the first and second rotatable screws positioned in generally parallel relationship on opposite sides of the first chain and engageable with the first chain such that rotation of the first and second screws in opposite directions causes linear movement of the first chain, and
the third and fourth rotatable screws positioned in generally parallel relationship on opposite sides of the second chain and engageable with the second chain such that rotation of the third and fourth screws in opposite directions causes linear movement of the second chain.

36. A method of conveying an item in an oil and gas well, comprising:
providing a downhole tractor comprising a motor, at least one rotatable screw powered by the motor, and a flexible track, the at least one rotatable screw being engageable with the track such that rotation of the at least one rotatable screw causes linear movement of the track,
connecting the item to the downhole tractor,
engaging the track with a surface,
activating the motor, and
moving the downhole tractor along the surface.

37. The method of claim 36, wherein the flexible track is a chain.

38. The method of claim 36, wherein rotation of the at least one rotatable screw in a first direction causes the downhole tractor to move along the surface in a first direction, and rotation of the at least one rotatable screw in a second direction opposite of the first direction causes the downhole tractor to move along the surface in a second direction opposite of the first direction.

39. The method of claim 36, wherein the flexible track is a chain, and wherein the at least one rotatable screw comprises:
first and second rotatable screws positioned in generally parallel relationship on opposite sides of the chain and engageable with the chain such that rotation of the first and second screws in opposite directions causes movement of the chain,
wherein activating the motor causes the first and second screws to rotate in opposite directions, such that the downhole tractor moves along the surface in a first direction.

40. The method of claim 39, further including activating the motor to reverse the direction of rotation of the first and second screws and move the dowuhole tractor along the surface in a second direction opposite of the first direction.

41. A method of conveying an item, comprising:
providing a vehicle including a motor, a first and a second chain, and a first, a second, a third and a fourth rotatable screw, each screw being powered by the motor, the first and second rotatable screws positioned in generally parallel relationship on opposite sides of the first chain and engageable with the first chain such that rotation of the first and second screws in opposite directions causes movement of the first chain, and the third and fourth rotatable screws positioned in generally parallel relationship on opposite sides of the second chain and engageable with the second chain such that rotation of the third and fourth screws in opposite directions causes movement of the second chain,
connecting the item to the vehicle,
engaging the first chain with a first surface,
engaging the second chain with a second surface,
activating the motor to rotate the first, second, third and fourth screws, and
moving the vehicle along the first and second surfaces in a first direction.

42. The method of claim 41, further including activating the motor to reverse the direction of rotation of the first, second, third and fourth screws and move the vehicle along the first and second surfaces in a second direction opposite of the first direction.

43. A method of conveying an item in a borehole having an inner surface, comprising:
providing a downhole tractor including a motor, a rotatable screw powered by the motor, and a flexible track, the screw being engageable with the track such that rotation of the screw causes movement of the track,
connecting the item to the tractor,
engaging the track with the surface,
activating the motor to rotate the screw in a first direction, and
moving the tractor along the surface in a first direction.

44. The method of claim 43, further including activating the motor to rotate in a second direction opposite of the first direction of rotation, and moving the tractor along the surface in a second direction opposite of the first direction of movement.

45. The method of claim 43, wherein the rotatable screw is a first rotatable screw, the tractor further includes a second rotatable screw, the flexible track is a chain, the first and second rotatable screws are positioned in generally parallel relationship on opposite sides of the chain and engageable with the chain such that rotation of the first and second screws in opposite directions causes movement of the chain, activating the motor causes the first and second screws to rotate in opposite directions.

46. A method of converting rotary motion into linear motion in a downhole tractor comprising:
providing at least one rotatable screw,
providing a flexible track,
engaging the at least one rotatable screw with the flexible track, and
rotating the at least one rotatable screw so as to move the flexible track.

* * * * *